Oct. 19, 1937. J. D. CRAWFORD 2,096,225
COMBINATION HOSE REEL CARRIAGE AND SPRINKLER
Filed Aug. 22, 1936 2 Sheets-Sheet 1

INVENTOR.
BY John D Crawford

ATTORNEY.

Oct. 19, 1937.  J. D. CRAWFORD  2,096,225
COMBINATION HOSE REEL CARRIAGE AND SPRINKLER
Filed Aug. 22, 1936    2 Sheets-Sheet 2
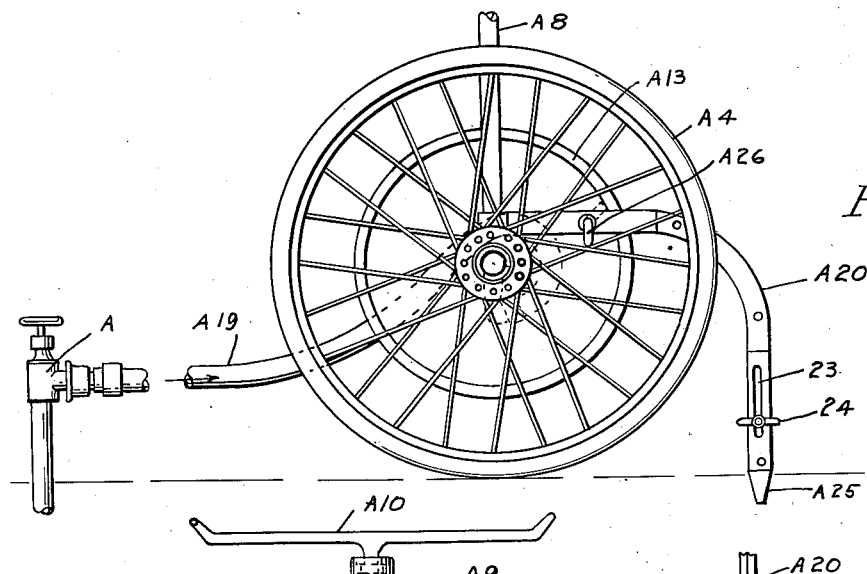
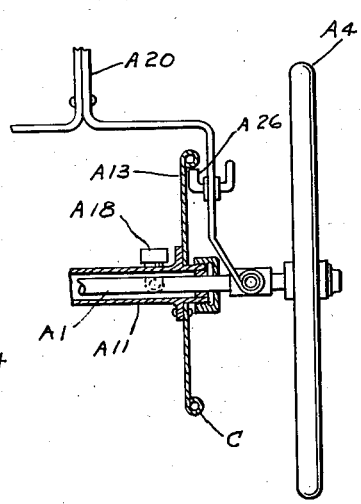
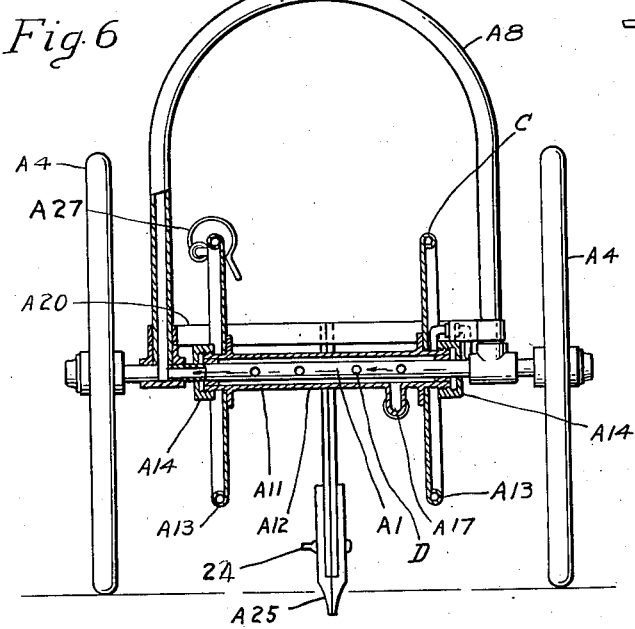
INVENTOR.
John D Crawford
BY
ATTORNEY.

Patented Oct. 19, 1937

2,096,225

UNITED STATES PATENT OFFICE 2,096,225

COMBINATION HOSE REEL CARRIAGE AND SPRINKLER

John D. Crawford, Los Angeles, Calif.

Application August 22, 1936, Serial No. 97,412

7 Claims. (Cl. 299—53)

My invention relates to sprinkling systems and has for its objects:

1. The provision of a combined sprinkling unit and the essentials thereof, including a sprinkler, a hose attached to said sprinkler, a reel attached to a framework, said framework mounted on wheels to complete a portable unit which may be conveniently moved from place to place for attachment to various hydrants.

2. The provision of a tubular framework for a carriage, said framework adapted to form a conduit for attachment to a sprinkler head.

3. The provision of a reel having a hollow axis through which water is conducted to a hose coupling, said hose coupling adapted to rotate with the reel.

4. The provision of means to hold the framework of said carriage in various fixed positions to suit the contour of the ground where the sprinkler is to be used.

5. A variable auxiliary supporting frame whereby the sprinkler frame may be tilted at various angles if so desired.

6. A sprinkler head carried by a framework, said framework forming a conduit and stand for the sprinkler, and the provision of a handle by which a carriage formed by said framework, having wheels attached thereto and a reel mounted thereon, may be conveniently moved from place to place.

Other and further objects of my invention will appear as the descriptive matter proceeds, as illustrated by the drawings.

It is specifically understood that the drawings are for the purpose of illustration only, and I do not confine myself to the actual structure shown, but may change the structure according to the contingencies of use within the scope of what is claimed.

Of the drawings:

Sheet 1, Fig. 1 is a top view of my invention with the hose removed showing the various components thereof.

Similar parts are designated by similar characters and numerals throughout the drawings. All of the numbers of Sheet 2 are preceded by the character A designating the various parts, the equivalent parts being numbered the same as Sheet 1.

Figure 1:
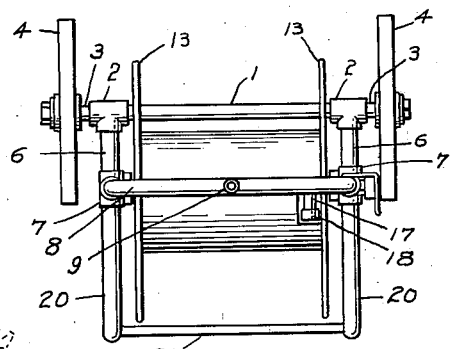
Figure 2:
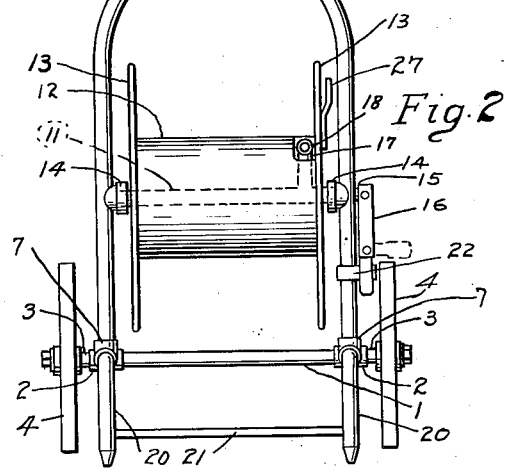
Fig. 2 is a head-on view of my invention.
Figure 3:
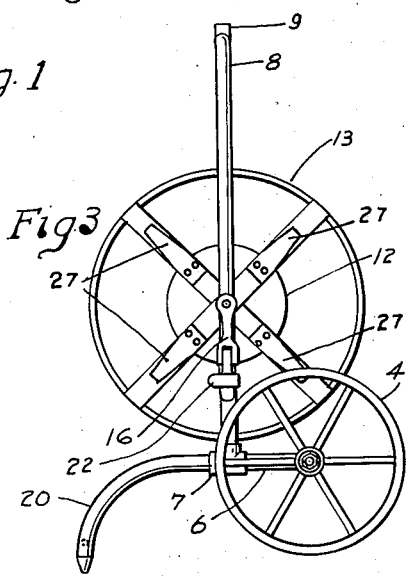
Fig. 3 is a side view of the portable unit comprising my invention.
Figure 4:
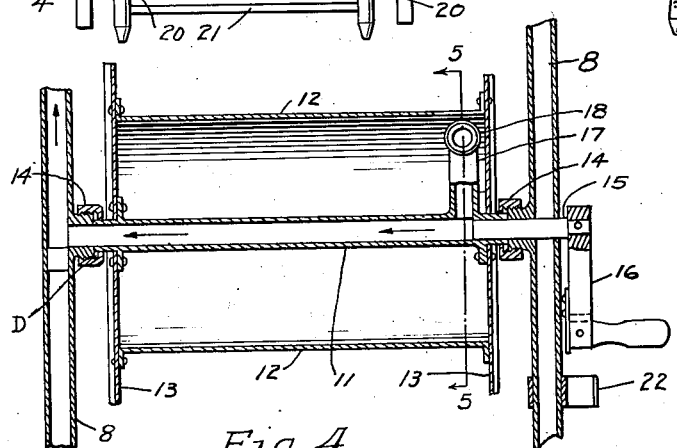
Fig. 4 is a fragmentary sectional view of the frame including the reel in longitudinal section.
Figure 5:
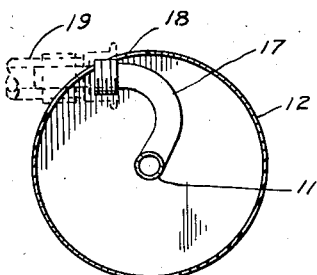
Fig. 5 is a cross section of the reel at 5—5 showing a view of the goose neck coupling extension.

Sheet 2 illustrates an alternative structure to that of Sheet 1.

Fig. 6 is a rear view of the assembled unit, showing the reel in longitudinal section.

Fig. 7 is a side view of the alternative structure, including the illustration of a hydrant.

Fig. 8 is a fragmentary portion of my invention showing part of the framework with the reel in section.

The various parts of my invention as of Sheet 1 of the drawings comprise a tubular framework consisting of an axle 1 which is threaded left hand at one end and right hand at the opposite end to join with fittings 2—2, axle stubs 3—3 being extended in alignment with axle 1, said stubs 3—3 having wheels 4 mounted thereon, nipples 6—6 are disposed at right angles to axle 1, the opposite ends of nipples 6—6 being connected to fittings 7 which have openings into which are attached the ends of tubular bow 8 having a sprinkler mounting 9 thereon, suitable for attaching a sprinkler 10.

A tubular axis 11 is provided integral with reel 12 having flanges 13. The tubular axis 11 extends beyond flanges 13 and is journaled into the packing glands D held in position by packing nuts 14 which are threadedly mounted on inwardly extending portions of bow 8.

A crank axis stub 15 is extended from one end of hollow axis 11 through bow 8, axis stub 15 has handle crank 16 attached thereto. A goose neck 17 having a coupling terminal end 18 for a hose 19 is extended at right angles from tubular axis 11.

Auxiliary supporting members 20 extend laterally from fittings 2—2 and are tied together by a transverse member 21. The terminal ends of the members 20 may be pointed as illustrated for penetrating the ground.

Sheet 2 illustrates an alternative form of my invention which contains all the various parts or their equivalent illustrated by Sheet 1.

Some of the parts as of Sheet 1 serve a dual purpose, taking the place of the various parts as of Sheet 1. For example, axle A1 provided with vents D serves the purpose of axle 1 Sheet 1 and is also a conduit, while tubular axis A11 serves the purpose of tubular axis 11. The axis A11 is disposed to rotate about the axle A1 and serves as both a conduit and drum A12. Axis A11 has packing nuts A14 mounted at either end thereof serving to journal axis A11 on axle A1. The coupling A17 is a simple elbow fitting instead of a goose neck 17 being provided as of Sheet 1.

The supporting members A20 are extended to a single point and comprise two metal straps attached to bow A8 and converging together to form a single point, having on either side thereof two slotted members forming a tip A25, there being a bolt A24 extending through slots A23 with a single bolt hole through the end of the members A20, a wing nut on bolt A24 serving to attach point A25 to the end of members A20.

The operation and use of my invention is as follows; referring to Sheet 1:

A hose is attached to coupling 18 and wound about drum 12 by means of crank 16. The end of the hose is coupled to a hydrant A as of Fig. 7, Sheet 2. The water being turned on, travels through hose 19 thence through coupling 18 goose neck 17, tubular axis 11 and bow 8 to actuate sprinkler 10.

My invention has the advantage of combining in a single organization all of the various elements necessary to form a portable unit whereby the combination hose reel carriage and sprinkler may be moved to any source of water supply for convenient use. The hose 19 may be unreeled without detaching from the hydrant A to accommodate the use of my device at various distances from the hydrant.

In order to fix bow 8 and sprinkler 10 in any desired position, upright or at an angle, to accommodate the contour of the terrain, it is only necessary to press the bow 8 in the direction toward the terminal 20 to force said terminals into the ground. The bar 21 provides a transverse member which may be used to facilitate pressing the points of members 20 into the ground by means of pressure with the foot.

A stop 22 is provided to move up and down on bow 8 to hold the crank 16 from turning when the hose is wound for transportation.

The spring hook 27 provides means for holding the end of the hose to the reel for the purpose of convenient transportation.

The alternative structure of Sheet 2 comprises an organization consisting of a carriage having a reel A12, the drum of said reel being formed by tubular axis A11 serving as a water conduit as well as a drum and rotating about the tubular axle A1 which serves as a conduit to bow 8.

When the hose A19 is attached to the hydrant A, the water flows through connections A18, axis A11, through holes D into axle A1, thence through bow A8 out through connection A9 and sprinkler head A10.

The beaded edge C of the drum flange A13 serves the purpose of a hand hold instead of crank 16 as of Sheet 1, by which the hose may be wound upon the reel for transportation. The hinged hook A27 serves to bind the hose to reel flange 13 and the cam A26 serves to lock the reel flange A13 in a fixed position in lieu of the crank stop 22 as of Sheet 1.

In order to adjust the position of the sprinkler to the contour of the terrain, the terminal end A25 is adjustably attached to the members A20 and, by loosening the bolt A24, the point A25 may be moved to any desired position, thus serving to hold the bow A8 at various angles when the point A25 is inserted in the ground.

Having described my invention, the form and use thereof, I claim:

1. A combination hose reel, carriage and sprinkler comprising a tubular axle serving as a water conduit, wheels mounted at the ends of said axle, a hose reel having a tubular axis serving as a water conduit journaled upon and concentrically around said first named axle, the portion of the axle surrounded by said hose reel being perforated, a hose coupling depending from said hollow axis, a tubular framework serving as a conduit for water attached to said tubular axle, whereby water is conducted through a hose attached to a hydrant thence through the axis of said reel, the axle of said framework and said framework to a sprinkler head mounted upon said framework.

2. As of claim 1, including adjustable means for tilting the framework and holding the sprinkler attached to said framework in various positions.

3. In combination, a pair of wheels mounted on an axle, an arched tubular framework forming a water conduit mounted on said axle, a reel having a tubular axis, said tubular axis forming a water-tight conduit contiguous with said arched tubular framework, water-tight journals between said reel having a tubular axis and said tubular framework, said tubular framework and said tubular axis forming a continuous water-tight conduit, including means whereby a hose may be attached between said water-tight conduit and a hydrant to operate a sprinkler attached to the apex of the arch of said tubular framework, a continuous laterally disposed framework portion extending from the reel carrying frame, terminating in a sharpened down-turned pointed structure adapted to be forced into the ground at variable depths to adjust the angle of disposal for said framework and sprinkler head.

4. As of claim 3, including clamps on the exterior end of the reel whereby said hose may be clamped to said reel, said reel having a crank attached to the axis thereof, said crank extending through the framework of the described device.

5. A device as of claim 3, the down-turned pointed structure being adjustably attached as concerns its length.

6. A combination as of claim 3, wherein the wheels are disposed and journaled on framework disposed laterally of said reel carrying frame and oppositely to the other said laterally extending framework.

7. A structure as of claim 3, wherein the wheels are mounted at the ends of the tubular axle, said axle being formed as a conduit and extending through the tubular axis of the reel.

JOHN D. CRAWFORD.